(12) United States Patent
Park et al.

(10) Patent No.: US 10,633,515 B2
(45) Date of Patent: Apr. 28, 2020

(54) ARTIFICIAL MARBLE CHIP, METHOD OF PREPARING THE SAME AND ARTIFICIAL MARBLE INCLUDING THE SAME

(71) Applicant: Lotte Advanced Materials Co., Ltd., Yeosu-si (KR)

(72) Inventors: Jong Chul Park, Uiwang-si (KR); Dong Jun Kim, Uiwang-si (KR); Chang Ho Son, Uiwang-si (KR); Doo Kyo Jeong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 74 days.

(21) Appl. No.: 15/844,755

(22) Filed: Dec. 18, 2017

(65) Prior Publication Data

US 2018/0171106 A1 Jun. 21, 2018

(30) Foreign Application Priority Data

Dec. 21, 2016 (KR) .................. 10-2016-0175444

(51) Int. Cl.
| | |
|---|---|
| *C08K 5/18* | (2006.01) |
| *C08K 5/3465* | (2006.01) |
| *C08K 3/22* | (2006.01) |
| *C08J 7/00* | (2006.01) |
| *D06P 3/52* | (2006.01) |
| *C04B 20/10* | (2006.01) |
| *C04B 26/06* | (2006.01) |
| *C04B 111/00* | (2006.01) |
| *C04B 111/54* | (2006.01) |

(52) U.S. Cl.
CPC ............ *C08K 5/18* (2013.01); *C04B 20/1033* (2013.01); *C04B 20/1059* (2013.01); *C04B 26/06* (2013.01); *C08J 7/00* (2013.01); *C08K 3/22* (2013.01); *C08K 5/3465* (2013.01); *D06P 3/52* (2013.01); *C04B 2111/00405* (2013.01); *C04B 2111/545* (2013.01); *C08K 2003/2227* (2013.01)

(58) Field of Classification Search
CPC .................................................. C04B 14/285
See application file for complete search history.

(56) References Cited

U.S. PATENT DOCUMENTS

| | | | |
|---|---|---|---|
| 3,079,209 A | 2/1963 | Boggus | |
| 3,092,836 A | 6/1963 | Boggus | |
| 2010/0113645 A1* | 5/2010 | Oh | B29C 67/242 523/171 |
| 2013/0316849 A1* | 11/2013 | Zieske | A63B 37/0003 473/371 |

FOREIGN PATENT DOCUMENTS

| | | | |
|---|---|---|---|
| EP | 2248856 A2 * | 11/2010 | C04B 26/14 |
| KR | 10-2014-0107072 A | 9/2014 | |

OTHER PUBLICATIONS

Machine translation KR 20140107072. (Year: 2014).*
Search Report in counterpart European Application No. 17208253.9 dated Apr. 20, 2018, pp. 1-8.

* cited by examiner

*Primary Examiner* — Alexandre F Ferre
(74) *Attorney, Agent, or Firm* — Additon, Higgins & Pendleton, P.A.

(57) ABSTRACT

Disclosed herein is an artificial marble chip having a color gradient from a surface thereof to inside.

10 Claims, 1 Drawing Sheet

ARTIFICIAL MARBLE CHIP, METHOD OF PREPARING THE SAME AND ARTIFICIAL MARBLE INCLUDING THE SAME

CROSS-REFERENCE TO RELATED APPLICATION

This application claims priority under 35 USC Section 119 to and the benefit of Korean Patent Application 10-2016-0175444, filed on Dec. 21, 2016, the entire disclosure of which is incorporated herein by reference.

FIELD

The present invention relates to an artificial marble chip, a method of preparing the same, and an artificial marble including the same.

BACKGROUND

Artificial marble is an artificial composite having a texture of natural stone and is fabricated by mixing a component such as natural crushed stone, minerals, and resin chips, and, optionally, additives such as a pigment with a base material such as an acrylic resin, an unsaturated polyester resin, an epoxy resin, and cement.

Artificial marble is mainly divided into solid products and granite products fabricated using chips. Examples of artificial marble include acrylic artificial marble, polyester artificial marble, epoxy artificial marble, melamine artificial marble, and engineered stone (E-stone)-based artificial marble. Artificial marble has a beautiful appearance and good processability and is lighter and stronger than natural marble. Thus, artificial marble is widely used as interior/exterior materials for butcher blocks, dressing tables, sinks, counters, walls, floors, and furniture.

In preparation of artificial marble, various chips having different sizes, colors, and materials are used to implement a pattern similar to natural stone or a novel pattern.

Conventionally, an artificial marble chip has been fabricated by coating a seed chip obtained by crushing a cured resin sheet with a resin syrup including a pigment, metal powder, and the like. However, an artificial marble chip fabricated by this coating method has a lack of natural texture since there is a great difference in color between a coating layer and a seed chip.

Therefore, there is a need for an artificial marble chip having a natural color gradient.

SUMMARY OF THE INVENTION

The present invention is aimed at providing an artificial marble chip having a color gradient from a surface thereof to inside (from a surface to an interior portion, for example, from the surface to the center), a method of preparing the artificial marble chip, and an artificial marble including the artificial marble chip to have a novel pattern.

Embodiments relate to an artificial marble chip. The artificial marble chip has a color gradient therein.

The artificial marble chip may include a core and a colored portion surrounding the core, wherein the colored portion may have a color gradient.

The color gradient may be generated such that brightness or chroma of color gradually increases from the surface thereof to inside (from the surface to an interior portion of) the artificial marble chip.

When the colored portion has a first color and the core has a second color, a mixed color of the first color and the second color is gradated in the colored portion.

The artificial marble chip may satisfy Equation 1:

$$Cc < Cs \tag{1}$$

where $Cs$ denotes a concentration of a colorant on the surface of the artificial marble chip, and $Cc$ denotes a concentration of the colorant at a center of the artificial marble chip.

The artificial marble chip may satisfy Equation 2:

$$Cc \leq C_{75} \leq C_{50} \leq C_{25} < Cs \tag{2}$$

where $Cs$ denotes a concentration of the colorant on the surface of the artificial marble chip; $C_{25}$ is a concentration of the colorant at a point corresponding to about 25% of a depth from the surface of the artificial marble chip to the center thereof; $C_{50}$ is a concentration of the colorant at a point corresponding to about 50% of the depth from the surface of the artificial marble chip to the center thereof; $C_{75}$ is a concentration of the colorant at a point corresponding to about 75% of the depth from the surface of the artificial marble chip to the center thereof; and $Cc$ denotes a concentration of the colorant at the center of the artificial marble chip.

The artificial marble chip may satisfy Equation 3:

$$1.2 \times C_{50} < Cs < 10{,}000 \times C_{50} \tag{3}$$

where $Cs$ denotes a concentration of the colorant on the surface of the artificial marble chip and $C_{50}$ is a concentration of the colorant at a point corresponding to about 50% of the depth from the surface of the artificial marble chip to the center thereof.

The core of the artificial marble chip may be free from a colorant.

The artificial marble chip may include about 100 parts by weight of an acrylic resin, about 100 parts by weight to about 200 parts by weight of inorganic fillers, and about 0.001 parts by weight to about 10 parts by weight of a colorant.

The inorganic fillers may include at least one selected from among silica, alumina, calcium carbonate, aluminum hydroxide, and magnesium hydroxide.

The artificial marble chip may have a ratio of minor axis to major axis of about 1:1 to about 1:5 in cross-section.

Embodiments also relate to a method of preparing an artificial marble chip as set forth above. The method includes bringing a seed chip into contact with a mixture including a colorant and an acrylic monomer to allow the colorant to permeate the seed chip.

The seed chip may include an acrylic resin and inorganic fillers.

Bringing the seed chip into contact with the mixture may include dipping the seed chip in the mixture at about 15° C. to about 30° C. for about 15 to 30 hours.

The colorant may be present in an amount of about 0.1 parts by weight to about 5 parts by weight relative to about 100 parts by weight of the acrylic monomer.

The seed chip may be brought into contact with the mixture in an amount of about 20 parts by weight to about 100 parts by weight relative to about 100 parts by weight of the mixture.

The method may further include, after the dipping step, cleaning the seed chip having the colorant dispersed therein with an acrylic monomer and drying the cleaned seed chip.

Drying the cleaned seed chip may be performed at about 50° C. to about 150° C. for about 30 to 120 minutes.

Other embodiments relate to an artificial marble. The artificial marble includes an artificial marble chip as set forth above.

DETAILED DESCRIPTION

Figure 1:
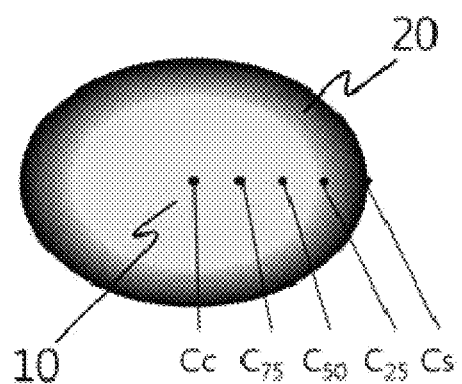
FIG. 1 is a conceptual view of an artificial marble chip according to one embodiment of the present invention.

Hereinafter, embodiments of the present invention will be described with reference to the accompanying drawings. It should be understood that the present invention is not limited to the following embodiments and may be embodied in different ways, and that the embodiments are provided for complete disclosure and thorough understanding of the present invention by those skilled in the art. In the drawings, thicknesses of various layers and regions are enlarged for clarity, and thicknesses of some layers and regions are exaggerated for convenience. In addition, although only a part of components is shown for convenience, the rest of the components will be easily conceived by those skilled in the art. Further, various modifications, changes, alterations, and equivalent embodiments can be made by those skilled in the art without departing from the spirit and scope of the invention.

Herein, for convenience of description, a colorant added from the outside is defined as a first colorant having a first color. A first colorant can be a colorant that is introduced into a seed chip described herein used to prepare the artificial marble chip and that is not inherent to and/or already a part of the seed chip prior to the preparation of the artificial marble chip. In addition, when a chip contains an inherent colorant, the inherent colorant is defined as a second colorant having a second color. A second colorant can be a colorant inherent to and/or added to a seed chip prior to the preparation of the artificial marble chip. Further, the first colorant and/or the second colorant may be a colorant prepared by mixing one or more dyes and/or pigments to obtain a single color.

FIG. 1 is a conceptual view of an artificial marble chip according to one embodiment of the present invention. Referring to FIG. 1, an artificial marble chip according to the present invention has a color gradient from the surface to inside.

The artificial marble chip can be prepared by introducing (injecting, transporting, permeating, etc.) a first colorant into a typical (conventional) seed chip for artificial marble. The first colorant is present at a high concentration on a surface of the seed chip, and decreases in concentration toward an inside (an interior portion) of the seed chip, whereby the seed chip can have a color gradient from the surface to the center thereof.

In one embodiment, the artificial marble chip may satisfy Equation 1:

$$Cc < Cs \quad (1)$$

wherein Cs denotes a concentration of the first colorant on the surface of the artificial marble chip, and Cc denotes a concentration of the first colorant at the center of the artificial marble chip.

In one embodiment, the artificial marble chip may satisfy Equation 2:

$$Cc \leq C_{75} \leq C_{50} \leq C_{25} < Cs \quad (2)$$

wherein Cs denotes a concentration of the first colorant on the surface of the artificial marble chip; $C_{25}$ is a concentration of the first colorant at a point corresponding to about 25% of the depth from the surface of the artificial marble chip to the center thereof; $C_{50}$ is a concentration of the first colorant at a point corresponding to about 50% of the depth from the surface of the artificial marble chip to the center thereof; $C_{75}$ is a concentration of the first colorant at a point corresponding to about 75% of the depth from the surface of the artificial marble chip to the center thereof; and Cc denotes a concentration of the first colorant at the center of the artificial marble chip.

In one embodiment, the artificial marble chip may satisfy Equation 3:

$$1.2 \times C_{50} < Cs < 10,000 \times C_{50} \quad (3)$$

wherein Cs denotes a concentration of the first colorant on the surface of the artificial marble chip, and $C_{50}$ is a concentration of the first colorant at a point corresponding to about 50% of the depth from the surface of the artificial marble chip to the center thereof.

In one embodiment, the first colorant may be allowed to permeate to a predetermined depth. In this case, for example referring again to FIG. 1, the artificial marble chip can include a core 10; and a colored portion 20 surrounding the core, wherein the colored portion has a color gradient. Here, the core 10 refers to an area into which the first colorant is not introduced (injected, transported, permeated, etc.), and the colored portion 20 refers to an area into which the first colorant is introduced (injected, transported, permeated, etc.).

In another embodiment, the first colorant may be allowed to permeate to the center of the chip. In this case, the artificial marble chip may be composed of a colored portion without a core.

In addition, various color gradients may be implemented depending on color of the seed chip.

In one embodiment, the artificial marble chip may be prepared using a seed chip containing no colorant. In this case, the first colorant allows the colored portion to have a first color gradient, and the color gradient may be generated such that the brightness or chroma of color increases from the surface to the center thereof. When the first colorant permeates from the surface of the seed chip to a predetermined depth, the core 10 can be free from any colorant.

In another embodiment, the artificial marble chip may be prepared using a seed chip containing a second colorant having a second color. In this case, due to the presence of the first colorant introduced (injected, transported, permeated, etc.) from the surface, a mixed color of the first color and the second color may be gradated in the colored portion of the artificial marble chip. When the first colorant permeates from the surface of the seed chip to a predetermined depth, the core has the second color of the second colorant, and, in the colored portion, a mixed color of the first color and the second color is gradated.

The artificial marble chip can include an acrylic resin, inorganic fillers, the first colorant, and optionally the second colorant.

The acrylic resin is not particularly limited and may include, for example, a polymer of one or more acrylic monomers such as but not limited to methyl (meth)acrylate, ethyl (meth)acrylate, butyl (meth)acrylate, 2-ethylhexyl (meth)acrylate, benzyl (meth)acrylate, glycidyl (meth) acrylate, and the like, and combinations thereof.

In one embodiment, the inorganic fillers may be any suitable inorganic fillers commonly used in artificial marble chips and artificial marbles. Examples of the inorganic fillers may include, without limitation, silica, alumina, calcium carbonate, aluminum hydroxide, magnesium hydroxide, and the like, and combinations thereof.

In one embodiment, each of the first colorant and the second colorant may include any suitable pigment and/or dye commonly used in artificial marble chips. For example, each of the first colorant and the second colorant (which can be the same or different) may include any typical pigment and/or dye used in artificial marble chips and artificial marbles, for example, reddish brown pigments such as iron oxide, yellow pigments such as iron hydroxide, green pigments such as chromium oxide, ultramarine pigments such as sodium aluminosilicate, white pigments such as titanium oxide, black pigments such as carbon black, and the like, and combinations thereof. In addition, each of the first colorant and the second colorant may include a metallic material such as a metal foil and/or pearls (pearlescent material) in order to provide sparkling accents to the seed chip.

In one embodiment, the artificial marble chip may include about 100 parts by weight of the acrylic resin; about 100 parts by weight to about 200 parts by weight, for example, about 110 parts by weight to about 190 parts by weight of the inorganic fillers; and about 0.001 parts by weight to about 10 parts by weight, for example, about 0.001 parts by weight to about 8.5 parts by weight of the colorant (first and/or second colorant).

In some embodiments, the artificial marble chip may include the inorganic fillers in an amount of about 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, or 200 parts by weight. Further, according to some embodiments, the amount of the inorganic fillers can be in a range from about any of the foregoing amounts to about any other of the foregoing amounts.

In some embodiments, the artificial marble chip may include the colorant in an amount of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, or 10 parts by weight. Further, according to some embodiments, the amount of the colorant can be in a range from about any of the foregoing amounts to about any other of the foregoing amounts.

When the amounts of the aforementioned components fall within these ranges, artificial marble fabricated using the artificial marble chip can have good mechanical properties, surface hardness, and/or appearance (color gradient).

In one embodiment, the artificial marble chip may have a major axis of about 0.1 cm to about 2 cm and a ratio of minor axis to major axis of about 1:1 to about 1:5 in cross-section. In some embodiments, the artificial marble chip may have a major axis of about 0.1, 0.2, 0.3, 0.4, 0.5, 0.6, 0.7, 0.8, 0.9, 1, or 2 cm and a ratio of minor axis to major axis of about 1:1, 1:2, 1:3, 1:4, or 1:5.

A method of preparing an artificial marble chip includes bringing a seed chip into contact (contacting a seed chip) with a mixture including a colorant and an acrylic monomer to allow the colorant to permeate into the seed chip.

In one embodiment, the seed chip may be any typical seed chip for artificial marble and may include, for example, the acrylic resin and the inorganic fillers such as set forth above.

The seed chip may further include one or more typical additives such as but not limited to an initiator, a crosslinking agent, a coupling agent, a surfactant, a curing accelerator, a flame retardant, an antistatic agent, an antibacterial agent, an anti-foaming agent, a dispersant, a molecular weight regulator, a UV absorber, and/or a colorant having a different color than the colored portion, and the like, and combinations thereof.

Examples of the initiator may include without limitation peroxide initiators as benzoyl peroxide, lauroyl peroxide, butyl hydroperoxide, and/or cumyl hydroperoxide, and/or azo compounds such as azobisisobutyronitrile. In addition, accelerators capable of promoting polymerization, such as organic metal salts and/or organic amines may be added to the initiator.

Examples of the crosslinking agent may include without limitation ethylene glycol dimethacrylate, propylene glycol dimethacrylate, glycerol trimethacrylate, trimethylpropane trimethacrylate, bisphenol A dimethacrylate, tetraethylene glycol, dimethacrylate, 1,6-hexanediol dimethacrylate, polybutylene glycol, ethylene glycol dimethacrylate, diethylene glycol dimethacrylate, triethylene glycol dimethacrylate, and the like, and combinations thereof.

In one embodiment, the seed chip may include the additives in an amount of about 3 parts by weight or less, for example, about 0.01 parts by weight to about 3 parts by weight, relative to about 100 parts by weight of the acrylic resin.

In one embodiment, the seed chip may be prepared by mixing the aforementioned components and curing the mixture to prepare a resin sheet, followed by crushing the resin sheet.

In one embodiment, bringing the seed chip into contact with the mixture may include dipping the seed chip in the mixture at about 15° C. to about 30° C., for example, about 20° C. to about 25° C., for about 15 to 30 hours, for example, about 20 to 24 hours. As a result, an artificial marble chip including a colored portion having a color gradient can be fabricated.

Examples of the acrylic monomer may include without limitation methyl (meth)acrylate, ethyl (meth)acrylate, butyl (meth)acrylate, 2-ethylhexyl (meth)acrylate, benzyl (meth) acrylate, and glycidyl (meth) acrylate, and the like, and combinations thereof.

The colorant is a pigment and/or a dye having a different color than the seed chip and may include any suitable pigment and/or dye commonly used in artificial marble chips and artificial marbles, for example, reddish brown pigments such as iron oxide, yellow pigments such as iron hydroxide, green pigments such as chromium oxide, ultramarine pigments such as sodium aluminosilicate, white pigments such as titanium oxide, black pigments such as carbon black, and the like, and combinations thereof. Advantageously, a dye can be used to easily stain the seed chip.

The mixture including a colorant and an acrylic monomer may include the colorant in an amount of about 0.01 parts by weight to about 8 parts by weight, for example, about 0.1 parts by weight to about 5 parts by weight, relative to about 100 parts by weight of the acrylic monomer. In some embodiments, the mixture of the colorant and the acrylic monomer may include the colorant in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, or 8 parts by weight. Further, according to some embodiments, the amount of the colorant can be in a range from about any of the foregoing amounts to about any other of the foregoing amounts.

Within this range, the colorant can sufficiently permeate the seed chip, thereby forming a colored portion having a color gradient.

The seed chip may be dipped in the mixture (brought into contact with the mixture) in an amount of about 20 parts by weight to about 100 parts by weight, for example, about 30 parts by weight to about 80 parts by weight, relative to about 100 parts by weight of the mixture. In some embodiments, the seed chip may be used in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 parts by weight. Further, according to some embodiments, the amount of the seed chip can be in a range from about any of the foregoing amounts to about any other of the foregoing amounts.

Within this range, the colorant can sufficiently permeate the seed chip, thereby forming a colored portion having a color gradient.

The method may further include, after the dipping process, cleaning the seed chip having the colorant dispersed therein with an acrylic monomer, and drying the cleaned seed chip. Here, the cleaned seed chip may be dried at about 50° C. to about 150° C., for example, about 80° C. to about 120° C., for about 30 to 120 minutes, for example, about 40 to 100 minutes. When the drying process is performed under these conditions, the artificial marble chip can have a good color intensity gradient.

Other embodiments include an artificial marble including the artificial marble chip as set forth above. For example, the artificial marble may be fabricated by a well-known fabrication method using the artificial marble chip described herein, wherein the artificial marble chip partially or completely replaces a conventionally used artificial marble chip for artificial marble known in the art. For example, the artificial marble chip described herein (optionally with a conventional artificial marble chip), inorganic fillers such as aluminum hydroxide, silica, and/or quartz and an initiator such as a peroxide initiator can be added to an acrylic resin syrup obtained by dissolving poly(methyl methacrylate) in a methyl methacrylate monomer to prepare an artificial marble composition, followed by curing the prepared artificial marble composition, thereby fabricating a sheet-type artificial marble. Here, a resin syrup for artificial marble well-known in the art, such as a polyester resin syrup and/or an epoxy resin syrup, may be used instead of the acrylic resin syrup.

The artificial marble according to the present invention is fabricated using the artificial marble chip including the colored portion having a color gradient and thus can implement a novel pattern.

Next, the present invention will be described in more detail with reference to the following examples. It should be understood that these examples are provided for illustration only and are not to be construed in any way as limiting the present invention. Descriptions of details apparent to those skilled in the art will be omitted for clarity.

EXAMPLE 1

Preparation of Artificial Marble Chip 2 parts by weight of a red dye (MACROLEX RED EG, Lanxess Chemicals) is mixed with 100 parts by weight of methyl methacrylate (MMA) to prepare a mixture, followed by dipping 50 parts by weight of a white poly(methyl methacrylate) (PMMA) seed chip (MC-QD, LOTTE ADVANCED MATERIALS) in 100 parts by weight of the mixture at 25° C. for 24 hours. Thereafter, the seed chip with the dye dispersed therein is cleaned with MMA, followed by drying in an oven at 100° C. for 1 hour, thereby preparing an artificial marble chip having a red color gradient.

EXAMPLE 2

Preparation of Artificial Marble Chip 2 parts by weight of a blue dye (MACROLEX BLUE 3R, Lanxess Chemicals) is mixed with 100 parts by weight of methyl methacrylate (MMA), thereby preparing a mixture, followed by dipping 50 parts by weight of a white poly(methyl methacrylate) (PMMA) seed chip (MC-QD, LOTTE ADVANCED MATERIALS) in 100 parts by weight of the mixture at 25° C. for 24 hours. Thereafter, the seed chip with the dye dispersed therein is cleaned with MMA, followed by drying in an oven at 100° C. for 1 hour, thereby preparing an artificial marble chip having a blue color gradient.

EXAMPLE 3

Figure 2:
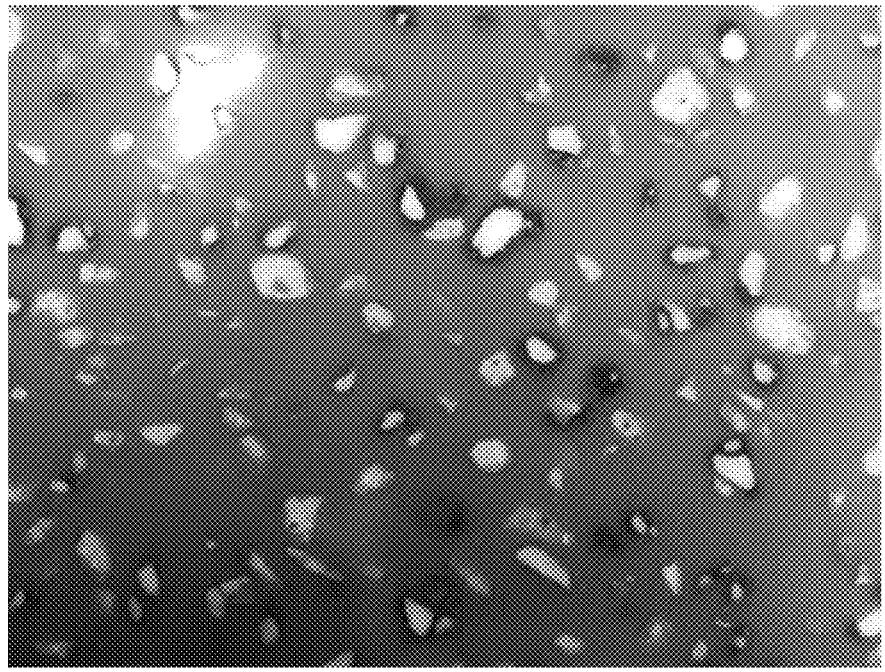
FIG. 2 shows a cross-sectional image of an artificial marble fabricated in Example 2.

Fabrication of Artificial Marble 100 parts by weight of an acrylic resin syrup including 18 wt % of poly(methyl methacrylate) and 82 wt % of methyl methacrylate is mixed with 180 parts by weight of inorganic fillers (aluminum hydroxide, ATH) to prepare a slurry. Thereafter, 25 parts by weight of the artificial marble chip prepared in Example 1 and having a red color gradient and 25 parts by weight of the artificial marble chip prepared in Example 2 and having a blue color gradient are added to 100 parts by weight of the slurry, and mixed for 20 minutes, followed by degassing and defoaming at 740 mmHg for 3 minutes. Then, 1.5 parts by weight of an initiator (CHEMEX-MOM, Dongsung Highchem) is added to the resulting slurry and stirred for 1 minute, thereby preparing an artificial marble slurry. The artificial marble slurry is poured into a die covered with a PV—OH film to perform casting, and cured in an oven at 80° C. for 1 hour, thereby fabricating an artificial marble. FIG. 2 shows a cross-sectional image of the fabricated artificial marble.

From FIG. 2, it can be seen that the artificial marble chips (Examples 1 and 2) according to the present invention have red and blue color gradients, respectively.

Exemplary embodiments have been disclosed herein, and although specific terms are employed, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

What is claimed is:

1. An artificial marble chip having a color gradient from a surface thereof to an interior portion thereof, comprising:
   about 100 parts by weight of an acrylic resin, about 100 parts by weight to about 200 parts by weight of inorganic fillers, and about 0.001 parts by weight to about 10 parts by weight of a colorant, wherein the color gradient is generated such that brightness or chroma of color gradually increases from the surface thereof to an interior portion thereof.

2. The artificial marble chip according to claim 1, comprising:

a core; and a colored portion surrounding the core, wherein the colored portion has a color gradient.

3. The artificial marble chip according to claim 2, wherein the colored portion has a first color and the core has a second color, and wherein a mixed color of the first color and the second color is gradated in the colored portion.

4. The artificial marble chip according to claim 1, wherein the artificial marble chip satisfies Equation 1:

$$Cc < Cs \quad (1)$$

where Cs denotes a concentration of a colorant on the surface of the artificial marble chip, and Cc denotes a concentration of the colorant at a center of the artificial marble chip.

5. The artificial marble chip according to claim 1, wherein the artificial marble chip satisfies Equation 2:

$$Cc \leq C_{75} \leq C_{50} \leq C_{25} < Cs \quad (2)$$

where Cs denotes a concentration of a colorant on the surface of the artificial marble chip; $C_{25}$ is a concentration of the colorant at a point corresponding to about 25% of a depth from the surface of the artificial marble chip to a center thereof; $C_{50}$ is a concentration of the colorant at a point corresponding to about 50% of the depth from the surface of the artificial marble chip to the center thereof; $C_{75}$ is a concentration of the colorant at a point corresponding to about 75% of the depth from the surface of the artificial marble chip to the center thereof; and Cc denotes a concentration of the colorant at the center of the artificial marble chip.

6. The artificial marble chip according to claim 1, wherein the artificial marble chip satisfies Equation 3:

$$1.2 \times C_{50} < Cs < 10{,}000 \times C_{50} \quad (3)$$

where Cs denotes a concentration of a colorant on the surface of the artificial marble chip and $C_{50}$ is a concentration of the colorant at a point corresponding to about 50% of a depth from the surface of the artificial marble chip to a center thereof.

7. The artificial marble chip according to claim 2, wherein the core is free from a colorant.

8. The artificial marble chip according to claim 1, wherein the inorganic fillers comprise silica, alumina, calcium carbonate, aluminum hydroxide, and/or magnesium hydroxide.

9. The artificial marble chip according to claim 1, wherein the artificial marble chip has a ratio of minor axis to major axis of about 1:1 to about 1:5 in cross-section.

10. An artificial marble comprising the artificial marble chip according to claim 1.

* * * * *